United States Patent
Dussac et al.

(10) Patent No.: US 6,851,515 B2
(45) Date of Patent: Feb. 8, 2005

(54) SOUNDPROOFING PANEL, IN PARTICULAR STRUCTURAL OR LINING PANEL FOR A ROTORCRAFT

(75) Inventors: Marc Francis Vincent Dussac, Miramas (FR); Philippe Vie, Toulouse (FR); Osmin Delverdier, St Jean Lherm (FR)

(73) Assignees: Eurocopter, Verlhaguet Montauban (FR); Ateca, Verlhaguet Montauban (FR)

( * ) Notice: Subject to any disclaimer, the term of this patent is extended or adjusted under 35 U.S.C. 154(b) by 82 days.

(21) Appl. No.: 10/168,025

(22) PCT Filed: Oct. 18, 2001

(86) PCT No.: PCT/FR01/03227

§ 371 (c)(1),
(2), (4) Date: Sep. 10, 2002

(87) PCT Pub. No.: WO02/32763

PCT Pub. Date: Apr. 25, 2002

(65) Prior Publication Data

US 2003/0057017 A1 Mar. 27, 2003

(30) Foreign Application Priority Data

Oct. 20, 2000 (FR) .............................. 00 13452

(51) Int. Cl.⁷ ................................. E04B 1/82

(52) U.S. Cl. ...................... 181/284; 181/286; 181/292; 181/294; 181/295

(58) Field of Search ................................ 181/284, 286, 181/292, 294, 295

(56) References Cited

U.S. PATENT DOCUMENTS

| | | | |
|---|---|---|---|
| 4,667,768 A | | 5/1987 | Wirt |
| 5,024,289 A | | 6/1991 | Merry |
| 5,225,622 A | * | 7/1993 | Gettle et al. .................. 86/50 |
| 5,777,947 A | | 7/1998 | Ahuja |
| 5,912,442 A | * | 6/1999 | Nye et al. .................. 181/292 |
| 6,085,865 A | | 7/2000 | Delverdier et al. |

FOREIGN PATENT DOCUMENTS

| | | |
|---|---|---|
| DE | 4438813 | 5/1996 |
| FR | 2649356 | 1/1991 |

* cited by examiner

*Primary Examiner*—Shih-Yung Hsieh
(74) *Attorney, Agent, or Firm*—Stevens, Davis, Miller & Mosher, LLP

(57) ABSTRACT

The invention concerns a sound-proofing panel, in particular a rotorcraft structural or lining panel: the sound-proofing panel (1) comprises at least two opposite plates (2, 3, 5, 6) forming between them a closed internal space (4), and an aggregate (7) including at least solid elements (8) in contact and which fills entirely said internal space (4).

12 Claims, 2 Drawing Sheets

SOUNDPROOFING PANEL, IN PARTICULAR STRUCTURAL OR LINING PANEL FOR A ROTORCRAFT

FIELD OF THE INVENTION

The present invention relates to a soundproofing panel.

BACKGROUND OF THE RELATED ART

The present invention is more especially applied, although not exclusively, to a structural panel or a lining panel of an aircraft, in particular of a rotorcraft. It is known that such a panel generally exhibits, in addition to its structural or lining function, a soundproofing function, in particular when it is mounted in the cockpit or the passenger cabin of said aircraft, where noise which is liable to be very troublesome for pilots and/or passengers is generated.

To this end, it will be noted that, on a rotorcraft, in particular a helicopter, the acoustic spectra defined in the range lying between 20 Hz and 20 kHz arise from the superposition of noise of different origins, which may be placed in two different groups depending on their spectral characteristics, namely pure sounds or discrete frequency noise and broadband noise.

In the known way, pure sounds or discrete frequency noise occurs in particular, as appropriate:

at the characteristic frequencies of the aircraft driveline;

at the rotational frequencies of the rotor blades (main and tail) and at the harmonics of these frequencies;

at the rotational frequencies of the blades of the compressors of the turbine engine units; and/or at the rotational frequencies of the blades of the blowers that cool the main gearbox or distribute cabin air and/or of electrical equipment, and at the harmonics of these frequencies, while broadband noise comprises, in particular, as appropriate:

the noise of the boundary layer that develops along the fuselage;

the noise generated by the rotors;

the noise of the air intake and nozzle flows;

the engine noise; and/or the noise of the circuits that provide the cockpit or the passenger cabin with climate control or heating.

All this noise, and more especially the discrete frequency noise, is very troublesome for the pilots and the passengers.

This is why, on helicopters, provision is often made for various technical means which are associated with structural or lining panels, to reduce the vibratory level or the acoustic radiation of sources of noise and/or of the fuselage of the helicopter, in order to reduce internal noise. To this end, various physical actions can be implemented by these technical means, in particular:

damping of the vibrations of the panels;

attenuation of the acoustic transmission of the panels;

acoustic absorption, by bonding a sound-absorbent foam cladding onto a face of a panel;

a double partition effect between a structural panel and an associated lining panel; and absorption by "Helmholtz resonator effect", by perforating the panels.

The first four physical actions listed above make it possible to reduce the overall noise level in a broad range of frequencies, but lead to a significant and highly disadvantageous increase in mass. In addition, the obtained reduction in noise is not selective enough to eliminate the acoustic annoyance specific to the emergence of the pure sounds.

By contrast, the fifth and final physical action listed above makes it possible effectively to reduce narrowband noise, but still only in a narrow band of frequencies, defined during design.

These various solutions are therefore not entirely effective, in particular for the discrete frequency noise generated by vibratory excitations.

A solution combining one or more of these physical actions advocates the creation of passive soundproofings in the form of lining panels mounted in the cockpit or in the passenger cabin. These panels are designed as a function of the structural region to be treated and of the frequency spectrum to be attenuated.

However, this last solution also has numerous drawbacks and in particular:

the noise reduction is limited, especially at low frequencies;

the increase in mass is high, and may be several hundreds of kilograms in the case of a large helicopter;

there is a not insignificant loss of volume, especially when using thick panels with a view to improving the acoustic absorption effect; and there are acoustic leakages, particularly at the wiring holes and the joints between the panels.

In consequence none of the abovementioned known solutions is entirely satisfactory in reducing the annoyance caused by noise, particularly discrete frequency noise.

SUMMARY OF THE INVENTION

The object of the present invention is to remedy these drawbacks. It relates to a soundproofing panel, in particular a structural panel or a lining panel, which exhibits improved acoustic performance.

To this end, said soundproofing panel is noteworthy, according to the invention, in that it comprises:

at least two opposite plates forming therebetween a closed internal space; and an aggregate which comprises at least stout bodies in contact and which completely fills said internal space.

Thus, by virtue of the invention, the relative slippage of the stout bodies, on the one hand, with respect to one another and, on the other hand, with respect to said plates, makes it possible to dissipate part of the vibratory energy circulating around said soundproofing panel and thus to reduce the energy which is transmitted in acoustic form to the air, thereby making it possible to considerably improve the acoustic performance of said soundproofing panel.

The present invention thus makes it possible to act on the two types of vibroacoustic response of a panel, namely:

the acoustic radiation of the panel under the effect of localized mechanical loading, such as for example vibrations at the meshing frequencies of the main gearbox of a helicopter; and the acoustic transmission of the panel loaded by a dynamic pressure field of acoustic or aerodynamic origin, such as for example on a helicopter, the noise emitted by the casing of the main gearbox or the entry noise of air exciting the ceiling of the cabin.

It will be noted that the present invention allows an appreciable improvement in the soundproofing performance of the panel in the so-called "SIL4" ("Speech Interference Level") frequency range, which consists of the four octaves with central frequencies: 500 Hz, 1000 Hz, 2000 Hz and 4000 Hz.

Advantageously, the stout bodies, in contact with one another (and for some with said plates) may be either directly in contact, or in contact by way of a structural element.

Within the framework of the present invention, said stout bodies, which are for example made of synthetic material, preferably beads, may be:

either solid, their entire mass then being occupied by material;

or hollow, which makes it possible to reduce the weight of said stout bodies and therefore also the weight of the soundproofing panel.

Furthermore, according to the invention, said stout bodies may be made from different materials (synthetic material, metal, etc.) and/or exhibit different shapes and/or sizes (diameters).

It will be noted that:

a difference in inertia of said stout bodies, due in particular to different sizes or densities; and/or a difference in stiffness of said stout bodies, due in particular to different materials give rise to a different movement under the effect of a vibrational excitation and therefore also a different magnitude of energy dissipation. In consequence, through a suitable selection of these characteristics, it is possible to adjust and optimize the energy dissipation, that is to say the noise reduction, implemented by the soundproofing panel according to the invention.

In a particular embodiment, said soundproofing panel comprises at least one honeycomb structure exhibiting cells, which is arranged in said internal space, and said stout bodies are disposed in at least some of said cells.

Additionally, advantageously, said soundproofing panel furthermore comprises at least one internal partition, solid or pierced, of any shape and orientation (for example parallel or orthogonal to one or to both plates), which may or may not be secured to one or to both plates and which is arranged in said internal space.

This makes it possible to increase the area for exchange (friction) between the panel and the aggregate and therefore also the dissipation of the energy liable to be transmitted in acoustic form.

Additionally, advantageously, said aggregate furthermore comprises a viscous liquid filling the spaces between said stout bodies.

In a particular embodiment, said opposite plates of the soundproofing panel are perforated. Such perforations allow, for example, a transfer of gas across the soundproofing panel (in particular in the case of an engine confined in an enclosure comprising such soundproofing panels) or the passage of a residual light flux (monitoring inside an enclosure comprising soundproofing panels: proper operation in the absence or, as appropriate, in the presence of a luminous intensity, etc.).

In addition to the aforesaid advantages, the soundproofing panel according to the invention also exhibits the following advantages:

it exhibits a reduced additional mass (in particular when hollow stout bodies are used) as compared with the basic panel (to be soundproofed);

it does not occupy any extra volume, unlike for example viscoelastic claddings bonded onto one of the faces of the panel;

it leads to no change in life span in the case of structural panels such as the mechanical floor of a helicopter for example;

the aggregate which it comprises is protected against external attack (fire, moisture, corrosive agents, etc.) by the soundproofing panel itself;

it does not release any particles (out of the panel), which could impair the operation of neighboring rotating components;

it can be mounted on any aircraft by simply changing the relevant component, since the outside shape, as well as the transmission of the static loads, are not changed;

it is not subjected to phenomena of abrasion, corrosion or erosion, if an appropriate pair of materials is selected for the plates and the aggregate respectively; and it can be made easily and has a low manufacturing cost.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
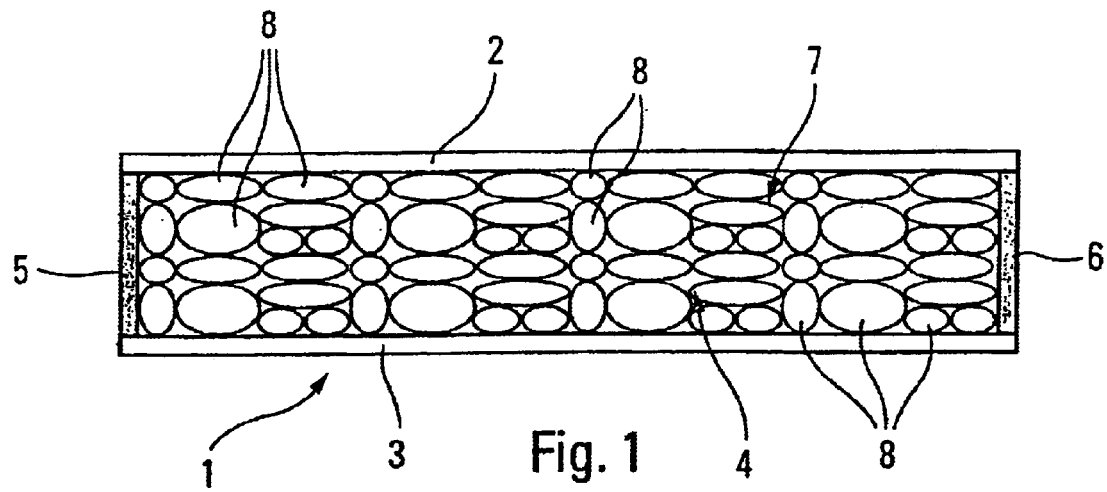
FIGS. 1 to 5 diagrammatically show various embodiments of a soundproofing panel according to the invention.

The soundproofing panel 1 according to the invention and represented diagrammatically in FIGS. 1 to 5, according to various embodiments, comprises:

two opposite plates 2 and 3 which form therebetween a hollow internal space 4. To this end, said plates 2 and 3 may be connected together by way of lateral plates 5 and 6; and an aggregate 7 which comprises stout bodies 8 in contact and which completely fills said internal space 4.

Thus, by virtue of the invention, the relative slippage of the stout bodies 8, on the one hand with respect to one another and, on the other hand, with respect to said plates 2, 3, 5 and 6, makes it possible to dissipate part of the vibrational energy circulating around said soundproofing panel 1 and thus to reduce the energy which is transmitted in acoustic form to the air, thereby making it possible to considerably improve the acoustic performance of said soundproofing panel 1.

The present invention thus makes it possible to act on the two types of vibroacoustic response of a soundproofing panel 1, namely:

the acoustic radiation of the panel 1 under the effect of localized mechanical loadings; and the acoustic transmission of the panel 1 loaded by a dynamic pressure field of acoustic or aerodynamic origin.

It will be noted that the present invention makes it possible to appreciably improve the soundproofing performance of the panel 1 in the so-called "SIL4" ("Speech Interference Level") frequency range, which consists of the four octaves with central frequencies: 500 Hz, 1000 Hz, 2000 Hz and 4000 Hz.

The two plates 2 and 3 which, assembled, form a sandwich structure, can be made from various materials, for example from a synthetic or lightweight metal.

Furthermore, these plates 2 and 3 may exhibit varied shapes. They may in particular be plane or exhibit one or more radii of curvature.

Moreover, they may be arranged parallel with respect to one another, as represented in FIGS. 1 to 5, or exhibit a different relative position, in particular any relative position.

In the context of the present invention, said stout bodies 8, which are made for example from synthetic material, preferably beads, may be:

either solid, their entire mass then being occupied by material;

or hollow, which makes it possible to reduce the weight of said stout bodies 8 and therefore also the weight of the soundproofing panel 1.

Figure 2:
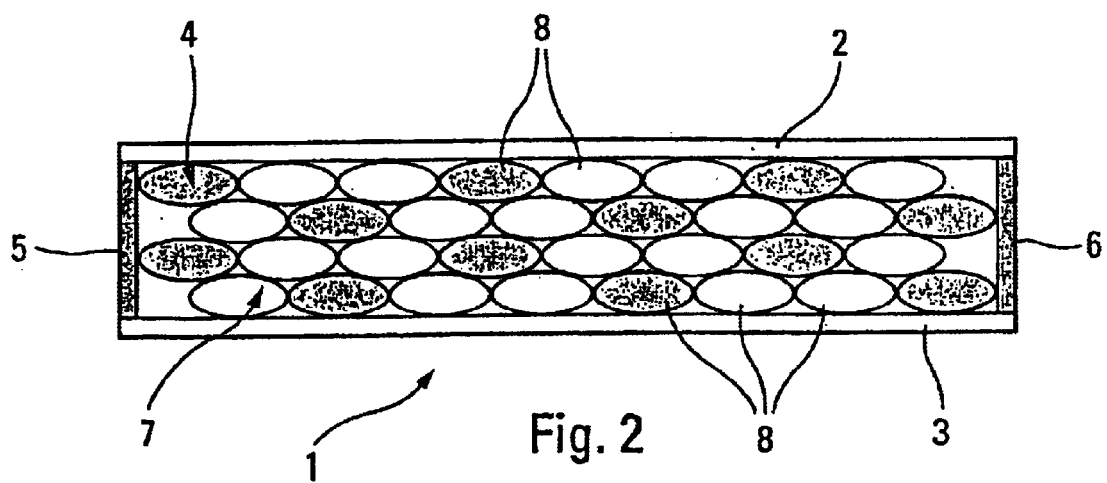

Furthermore, according to the invention, said stout bodies 8:

may be made from different materials (polymer, metallic ceramic, elastomer, etc.), as is represented in FIG. 2 which shows stout bodies 8 with different shadings (light or dark), which are of identical shape and size, but which are made from different materials; and/or can exhibit different shapes and/or sizes (diameters), as is represented in FIG. 1.

It will be noted that:

a difference in inertia of said stout bodies 8, due in particular to different sizes or densities; and/or a difference in stiffness of said stout bodies 8, due in particular to different materials give rise to a different movement under the effect of a vibrational excitation and therefore also a different magnitude of energy dissipation. In consequence, through a suitable selection of these characteristics, it is possible to adjust and optimize the energy dissipation, that is to say the noise reduction, implemented by the soundproofing panel 1 according to the invention.

Figure 3:
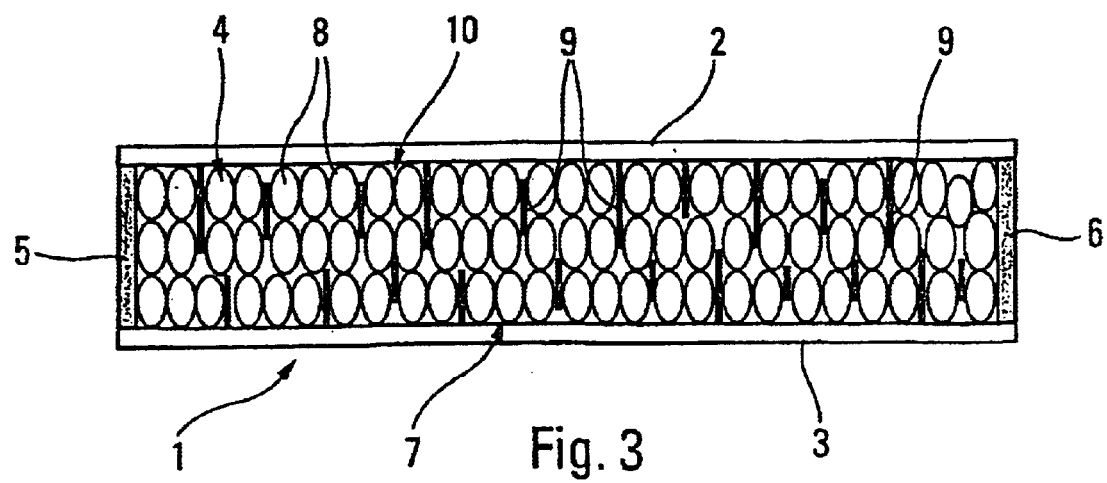

According to the invention, the stout bodies 8, in contact with one another (and for some with the plates 2, 3, 5 and 6) may be either directly in contact, or in contact by way of a structural element 9, as is represented for example in FIG. 3.

In the particular embodiment of FIG. 3, said soundproofing panel 1 comprises at least one honeycomb structure 9 which exhibits cells 10, which is arranged in said internal space 4, and which is for example made of metal or of composite material, and said stout bodies 8 are disposed in at least some of said cells 10.

In addition to said stout bodies 8, solid or hollow, the aggregate 7 can also comprise a viscous liquid, filling the free spaces in the internal space 4 between said stout bodies 8. The latter are then submerged in a lubricating medium, thereby making it possible to delay any heating.

Figure 4:
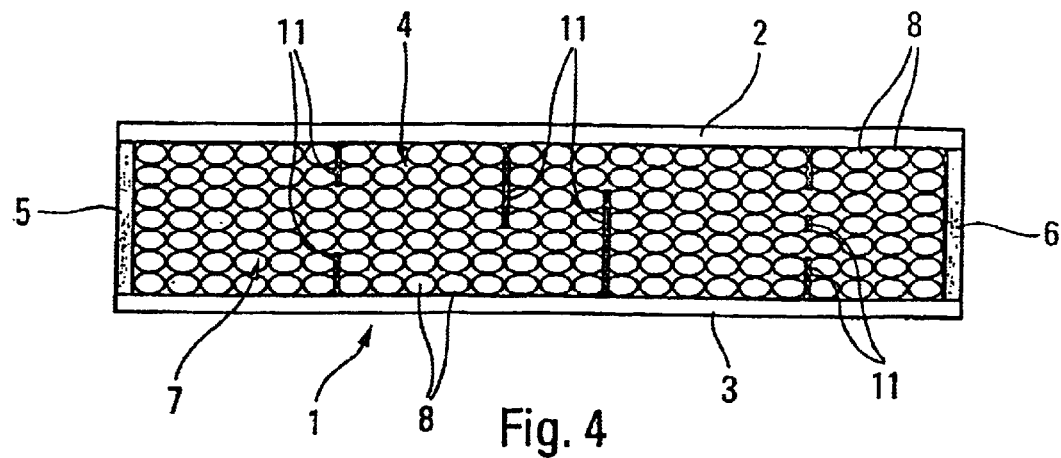
Figure 5:
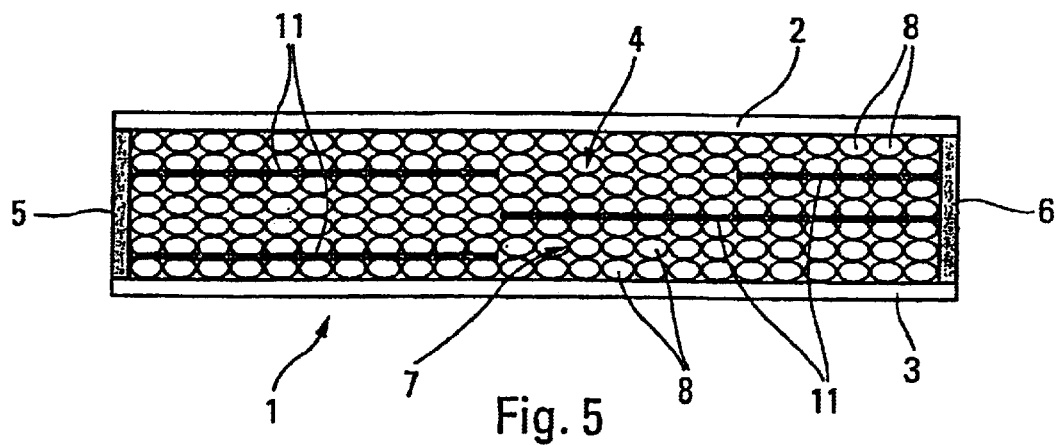

Additionally, in a particular embodiment represented in FIGS. 4 and 5, the soundproofing panel 1 comprises internal partitions 11 which are secured to one or more of the plates 2, 3, 5 and 6. These partitions 11 may be solid or pierced and exhibit any shapes.

Preferably, they are plane and are either orthogonal to the plates 2 and 3 which are parallel to one another (FIG. 4) or parallel to said plates 2 and 3 (FIG. 5).

These internal partitions 11 make it possible to increase the area for exchange and therefore the frictional area between, on the one hand, the internal faces of the plates 2, 3, 5 and 6 and, on the other hand, the aggregate 7, thereby making it possible to boost the dissipation of the vibrational energy (circulating around the soundproofing panel 1 and liable to be transmitted in acoustic form to the surrounding air).

The present invention can be applied to any type of soundproofing panel 1 and, in particular, although not exclusively, to panels used in aeronautics and in particular on rotorcraft.

By way of illustration, on such a rotorcraft, for example a helicopter, the present invention can be applied:

to sandwich parts of the walls of the fuselage constituting the cockpit: ceiling, doors, partitions, for dividing, etc;

to the lining of the passenger cabin, on the fixed parts (fascias, panels, etc.) or moving parts (doors, etc.);

to the engine cowling;

to the cowling of air intakes of an engine or of the air intake of the main gearbox;

to the cowling of the gearbox casings; and to the insulation of electrical cabinets comprising one or more cooling fans.

In such an application, said soundproofing panel 1 according to the invention can reduce numerous types of noise and, in particular:

the meshing or running noise from gearboxes (MGB, IGB, TGB);

the meshing or running noise of accessory units (lubricating pumps, drives of a ventilating, air conditioning set, etc.);

the air intake noise of an engine or of the main gearbox MGB;

ventilation noise;

heating noise; and air conditioning noise.

Figure 6:
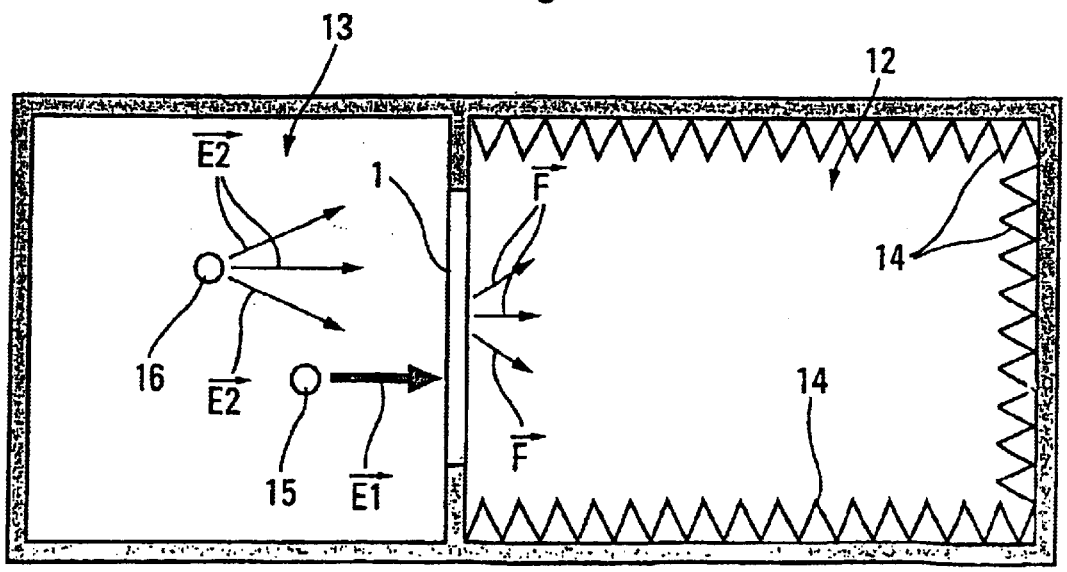
FIG. 6 diagrammatically illustrates a particular application of a soundproofing panel according to the invention.

By way of example, the soundproofing panel 1 according to the invention can be a structural panel acoustically insulating an enclosed space 12, for example the cockpit or the passenger cabin of a helicopter from noise emanating from a neighboring space 13, as represented in FIG. 6. Generally, said soundproofed enclosed space 12 is furnished with additional, known means 14 for reducing or absorbing noise.

In this case, the soundproofing panel 1 is intended to reduce the noise illustrated by arrows $\vec{F}$ in FIG. 6, which penetrates the soundproofed space 12, by reducing:

the acoustic radiation generated under the effect of localized mechanical loads, illustrated by an arrow $\vec{E1}$, namely dynamic moments or forces originating from a moving or vibrating element 15, for example the excitation $\vec{E1}$ originating from the leg straps 15 of suspension bars of the main gearbox of a helicopter; and/or the acoustic transmission, invoked by a dynamic pressure field of acoustic or aerodynamic origin, illustrated by arrows $\vec{E2}$, for example the outside noise $\vec{E2}$ originating from the casing 16 of the main gearbox of a helicopter.

In addition to the aforesaid advantages, the soundproofing panel 1 according to the invention also exhibits the following advantages:

it exhibits a reduced additional mass (in particular when hollow stout bodies 8 are used) as compared with a basic panel to be soundproofed, that is to say a standard sandwich panel before the addition of stout bodies 8 into its internal space 4 with the aim of soundproofing it;

it does not occupy any extra volume as compared with a basic panel of this kind, unlike for example viscoelastic claddings bonded onto one of the faces of the panel;

it leads to no change in life span in the case of structural panels such as the mechanical floor of a helicopter for example;

the aggregate 7 which it comprises is protected against external attack (fire, moisture, corrosive agents, etc.) by the soundproofing panel 1 itself;

it does not release any particles out of the panel 1 which could impair the operation of neighboring rotating components;

it can be mounted on any apparatus, moving body or aircraft by simply changing the relevant component, since the outside shape, as well as the transmission of static loads, are not changed;

it is not subjected to phenomena of abrasion, corrosion or erosion, if an appropriate pair of materials is selected for the plates 2, 3, 5 and 6 and the aggregate 7 respectively; and it can be made easily and has a low manufacturing cost.

What is claimed is:

1. A soundproofing panel, comprising:

at least two substantially plane opposite plates forming therebetween a closed internal space;

an aggregate which comprises at least stout bodies in contact and which completely fills said internal space, said stout bodies being able to slip, on the one hand, with respect to one another and, on the other hand, with respect to said plates in such a way as to dissipate part of the vibratory energy circulating around said soundproofing panel, at least some of said stout bodies being directly in contact with one another, and wherein an area for friction between the panel and the aggregate is obtained; and at least one internal partition which is arranged inside said internal space, substantially parallel to said plates which are substantially parallel to one another, wherein said internal partition is at least partially pierced.

2. A soundproofing panel, comprising:

at least two opposite plates forming therebetween a closed internal space;

an aggregate which comprises at least stout bodies in contact and which completely fills said internal space, said stout bodies being able to slip, on the one hand, with respect to one another and, on the other hand, with respect to said plates in such a way as to dissipate part of the vibratory energy circulating around said soundproofing panel; and at least one honeycomb structure having cells, which is arranged in said internal space, at least some of said stout bodies being directly in contact with one another, a plurality of said stout bodies being disposed in one of said cells, wherein an area for friction between the panel and the aggregate is obtained and vibratory energy dissipation is boosted.

3. The soundproofing panel as claimed in claim 2, wherein least some of said stout bodies are hollow.

4. The soundproofing panel as claimed in claim 2, wherein at least some of said stout bodies are solid.

5. The soundproofing panel as claimed claim 2, wherein aggregate comprises stout bodies made from different materials.

6. The soundproofing panel as claimed in claim 2, wherein said aggregate comprises stout bodies having different shapes.

7. The soundproofing panel as claimed in claim 2, wherein said aggregate comprises stout bodies having different sizes.

8. The soundproofing panel as claimed in claim 2, wherein it furthermore comprises at least one internal partition which is arranged inside said internal space, substantially parallel to said plates which are substantially parallel to one another.

9. The soundproofing panel as claimed in claim 8, wherein said internal partition is at least partially pierced.

10. The soundproofing panel as claimed in claim 2, wherein it furthermore comprises at least one internal partition which is arranged inside said internal space, substantially orthogonal to said plates which are substantially parallel to one another.

11. The soundproofing panel as claimed in claim 2, wherein said aggregate furthermore comprises a viscous liquid filling the spaces between said stout bodies.

12. The soundproofing panel as claimed in claim 2, wherein said opposite plates are perforated.

* * * * *